United States Patent [19]

Hirose et al.

[11] Patent Number: 4,727,589
[45] Date of Patent: Feb. 23, 1988

[54] PICTURE DATA STORAGE/RETRIEVAL SYSTEM

[75] Inventors: Kenji Hirose; Akira Hamade, both of Yokohama, Japan

[73] Assignee: Tokyo Shibaura Denki Kabushiki Kaisha, Kawasaki, Japan

[21] Appl. No.: 918,586

[22] Filed: Oct. 9, 1986

Related U.S. Application Data

[63] Continuation of Ser. No. 552,961, Nov. 17, 1983, abandoned.

[30] Foreign Application Priority Data

Nov. 30, 1982 [JP] Japan .................. 57-209651

[51] Int. Cl.[4] ......................................... G06K 9/36
[52] U.S. Cl. ............................. 382/56; 364/200; 364/900; 382/1
[58] Field of Search ............ 382/1, 61, 56; 358/286, 358/903; 364/514, 200 MS File, 900 MS File; 179/2 R; 235/379, 380

[56] References Cited

U.S. PATENT DOCUMENTS

| | | | |
|---|---|---|---|
| 4,091,448 | 5/1978 | Clausing | 235/379 |
| 4,114,027 | 9/1978 | Slater et al. | 235/379 |
| 4,386,373 | 5/1983 | Kondo et al. | 364/514 |
| 4,417,282 | 11/1983 | Yamamoto | 358/296 |
| 4,485,411 | 11/1984 | Yamamoto | 358/296 |
| 4,498,107 | 2/1985 | Yoshimaru et al. | 358/903 |
| 4,532,379 | 7/1985 | Tsukioka | 179/2 R |
| 4,555,803 | 11/1985 | Hirose | 382/61 |
| 4,636,848 | 1/1987 | Yamamoto | 358/903 |

FOREIGN PATENT DOCUMENTS

3125735 3/1982 Fed. Rep. of Germany .

Primary Examiner—Leo H. Boudreau
Assistant Examiner—Joseph Mancuso
Attorney, Agent, or Firm—Cushman, Darby & Cushman

[57] ABSTRACT

A plurality of picture data storage/retrieval apparatuses are connected to each other through a communication line. Each picture data storage/retrieval apparatus has a two-dimensional scanning device for inputting picture data, a keyboard for entering control data, an optical disk for storing the picture data input through the two-dimensional scanning device, a floppy disk for storing a control program, a CRT display device for displaying the picture data stored in the optical disk, a printer for producing a hard copy of the picture data stored in the optical disk, and a communication control unit. When a given apparatus desires registration, retrieval or deletion of picture data in another apparatus, a control unit of the given apparatus communicates with the another apparatus through the communication control units.

6 Claims, 10 Drawing Figures

PICTURE DATA STORAGE/RETRIEVAL SYSTEM

This is a continuation of application Ser. No. 552,961, filed Nov. 17, 1983, which was abandoned upon the filing hereof.

BACKGROUND OF THE INVENTION

The present invention relates to a picture data storage/retrieval system having a plurality of picture data storage/retrieval apparatuses.

A picture data storage/retrieval apparatus has been developed and has been put into use. Such a picture data storage/retrieval apparatus optically reads a large amount of picture data such as a document by two-dimensional scanning. The readout picture data is stored in a picture data memory such as an optical disk. Required data among the thus stored picture data is retrieved as needed and the retrieved data is monitored on a TV monitor or is printed.

As an example of an application of such a picture data storage/retrieval apparatus, a plurality of such picture data storage/retrieval apparatuses are located at various branches of a company or at different companies (to be referred to as offices). In this case, each apparatus stores (to be referred to as registration) picture data particular to each office. In addition, each apparatus also registers common picture data.

When a given office wishes to access some picture data stored at the apparatus of another office or when picture data already stored in an apparatus of a given office is required to be registered in the apparatus of another office, apparatuses for copying and sending the picture data, for transferring by way of facsimile systems, or for communicating for such transfer purposes are necessary, resulting in inconvenience.

SUMMARY OF THE INVENTION

It is an object of the present invention to provide a picture data storage/retrieval system wherein each of a plurality of picture data storage/retrieval apparatuses can perform registration, retrieval, and deletion of desired picture data with any of the remaining apparatuses.

In order to achieve the above object of the present invention, there is provided a picture data storage/retrieval system comprising a plurality of picture data storage/retrieval apparatuses connected through a communication line, each picture data storage/retrieval apparatus of said plurality of picture data storage/retrieval apparatuses including: a scanning device for inputting picture data; a keyboard unit for entering control data; a first memory device for storing the picture data input from said scanning device; a second memory device for storing a control program; a visual display unit for visually displaying the picture data stored in said first memory device; a communication control unit for allowing communication with another picture data storage/retrieval apparatus of said plurality of picture data storage/retrieval apparatuses; and a main control unit, operative in accordance with the control program stored in said second memory device, for controlling said scanning device, said keyboard unit, said first memory device, and said visual display units so as to perform registration, retrieval and deletion of picture data of each picture data storage/retrieval apparatus, and for communicating with another picture data storage/retrieval apparatus through said communication control units of said each picture data storage/retrieval apparatus and with another picture data storage/retrieval apparatus so as to perform registration, retrieval and deletion of the picture data of said another picture storage/retrieval apparatus.

According to the picture data storage/retrieval system of this invention, one of the picture data storage/retrieval apparatuses serves as a first station, and the other apparatuses serve as second stations. Each second station possesses picture data associated only with this second station, and not with other second stations. Also, index data representing the picture data is stored in this second station. When desired picture data is not possessed by the second station, the second station requests the first station to send a volume of index data representing the desired picture data to the second station at one time. Then, the second station searches index data volume off line for particular index data and requests the first station in an online mode to send the first station the desired picture data specified by the particular index data. Therefore, the system of this invention requires that the second station should communicate with the first station only twice in order to receive the desired picture data, these two communications being transfer of titles, and transfer of picture data. This reduces the load of the first station, and quickens the time necessary to retrieve the desired picture data.

DETAILED DESCRIPTION OF THE PREFERRED EMBODIMENT

Figure 1:
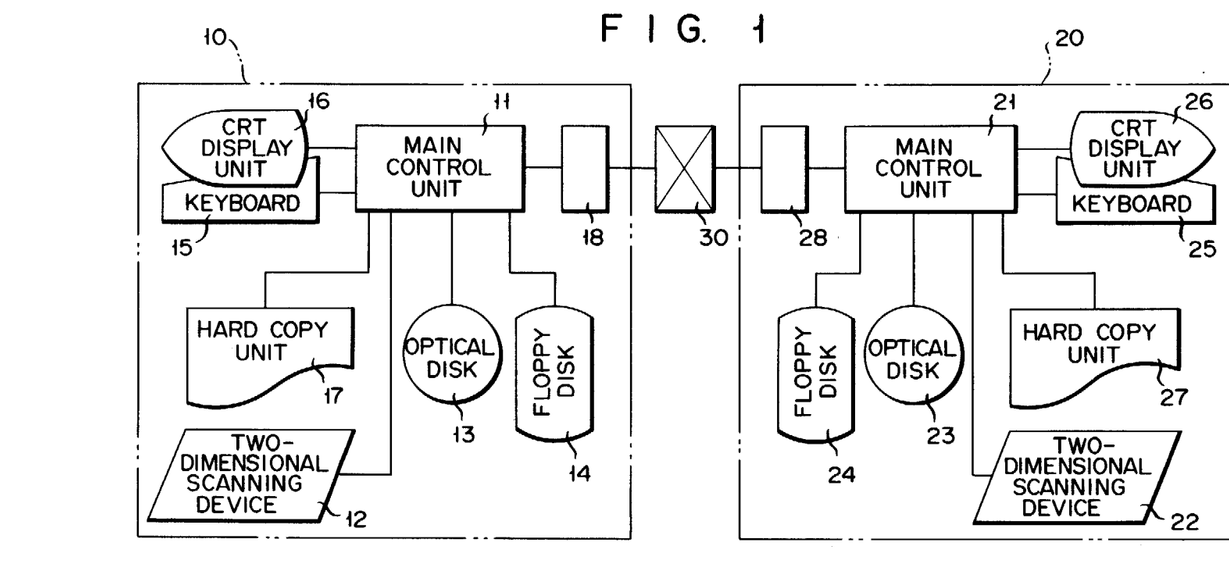
FIG. 1 is a block diagram showing a picture data storage/retrieval system according to an embodiment of the present invention.

FIG. 1 is a block diagram of a picture data storage/retrieval system according to the present invention. Referring to FIG. 1, the picture data storage/retrieval system has first and second picture data storage/retrieval apparatuses 10 and 20. These first and second picture data storage/retrieval apparatuses 10 and 20 are connected through a communication line 30. Although only two picture storage/retrieval apparatuses are shown for the sake of simplicity in the figure, the number of apparatuses which may be connected in the system of the present invention is not particularly limited.

The picture data storage/retrieval apparatuses 10 and 20 have respective two-dimensional scanning devices 12 and 22 for two-dimensionally scanning picture data and inputting the scanned data, optical disks 13 and 23 for storing the picture data input from the scanning devices 12 and 22, floppy disks 14 and 24 for storing management data (e.g., title data or index data of the picture data) for managing the picture data stored in the optical disks 13 and 23 and for storing the control programs for main control units to be described later, keyboards 15 and 25 for entering control data or title data, CRT display units 16 and 26 for displaying the picture data, hard copy units 17 and 27 for producing hard copies of the picture data, and communication control units 18 and 28 for performing transmission/reception of the picture data with another picture data storage/retrieval apparatus. Main control units 11 and 21 respectively control the two-dimensional scanning devices 12 and 22, the optical disks 13 and 23, the floppy disks 14 and 24, the keyboards 15 and 25, the CRT display units 16 and 26, the hard copy units 17 and 27, and the communication control units 18 and 28, in accordance with the control programs stored in the floppy disks 14 and 24, respectively. The main control units 11 and 21 may comprise microcomputers, examples of which include TOSHIBA 8085 8-bit microcomputer, TOSHIBA CORPORATION, Japan. As has been described earlier, the apparatuses 10 and 20 are connected through the communication line 30.

Each of the modes of the picture data storage/retrieval system of the configuration as described above will now be described with reference to FIGS. 3A through 5C. These modes are (1) retrieval, (2) deletion, and (3) registration, or storing in a register. For the sake of descriptive convenience, the apparatus 10 which is one substation, will be referred to as a second station, and the apparatus 20 which is the main station, will be referred to as a first station.

Figure 3A:
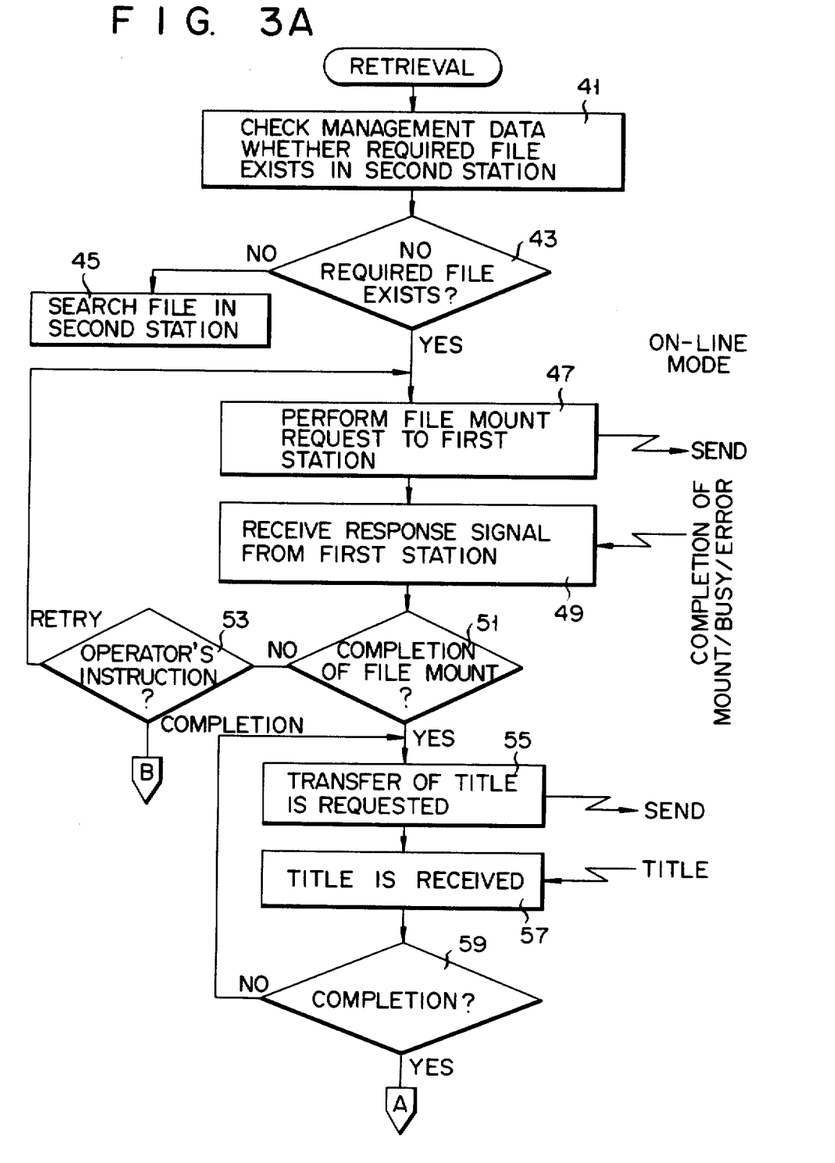
FIGS. 3A and 3B are flow charts for explaining the mode of operation of the system shown in FIG. 1 in the retrieval mode.
Figure 3B:
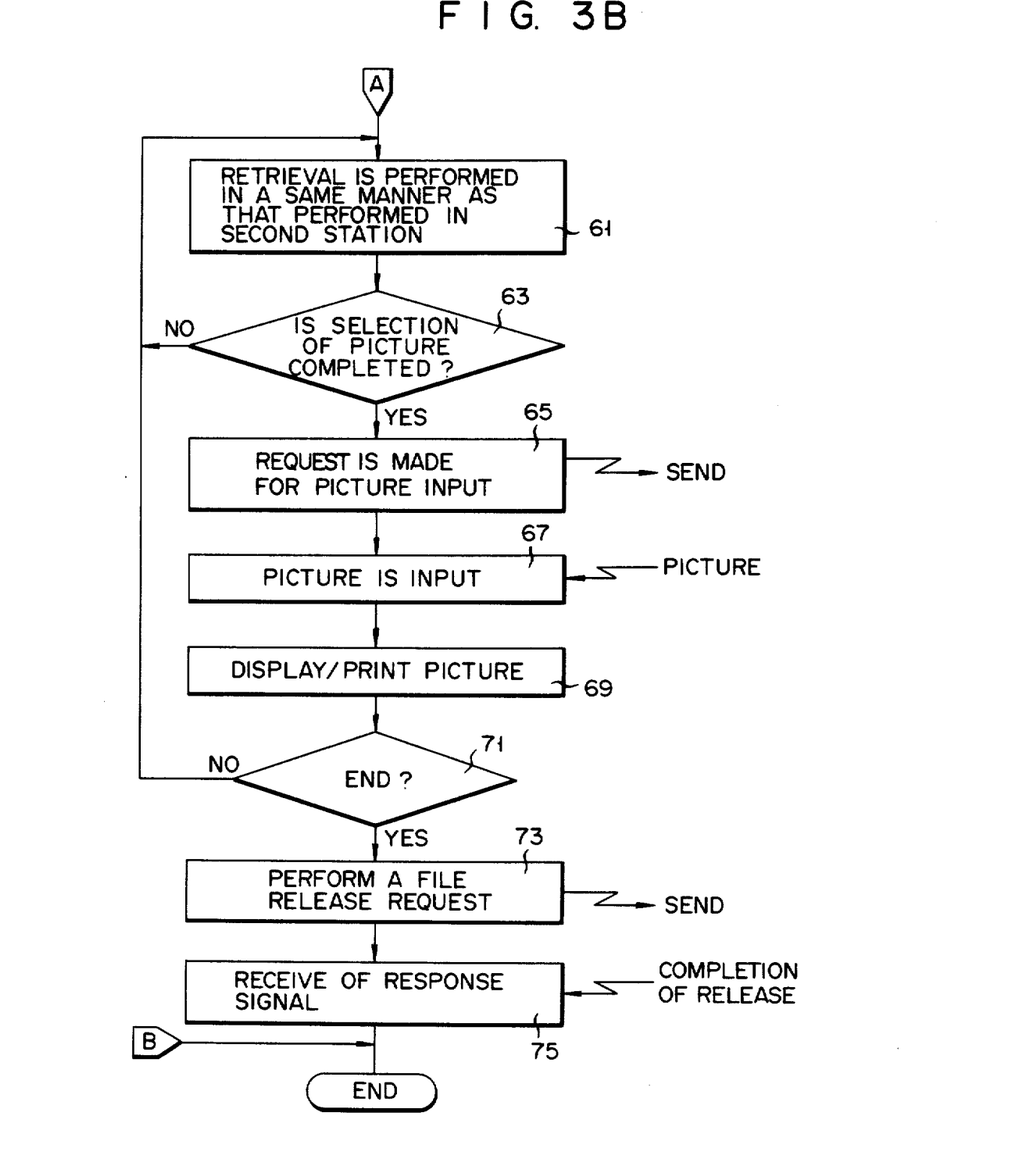
Figure 4A:
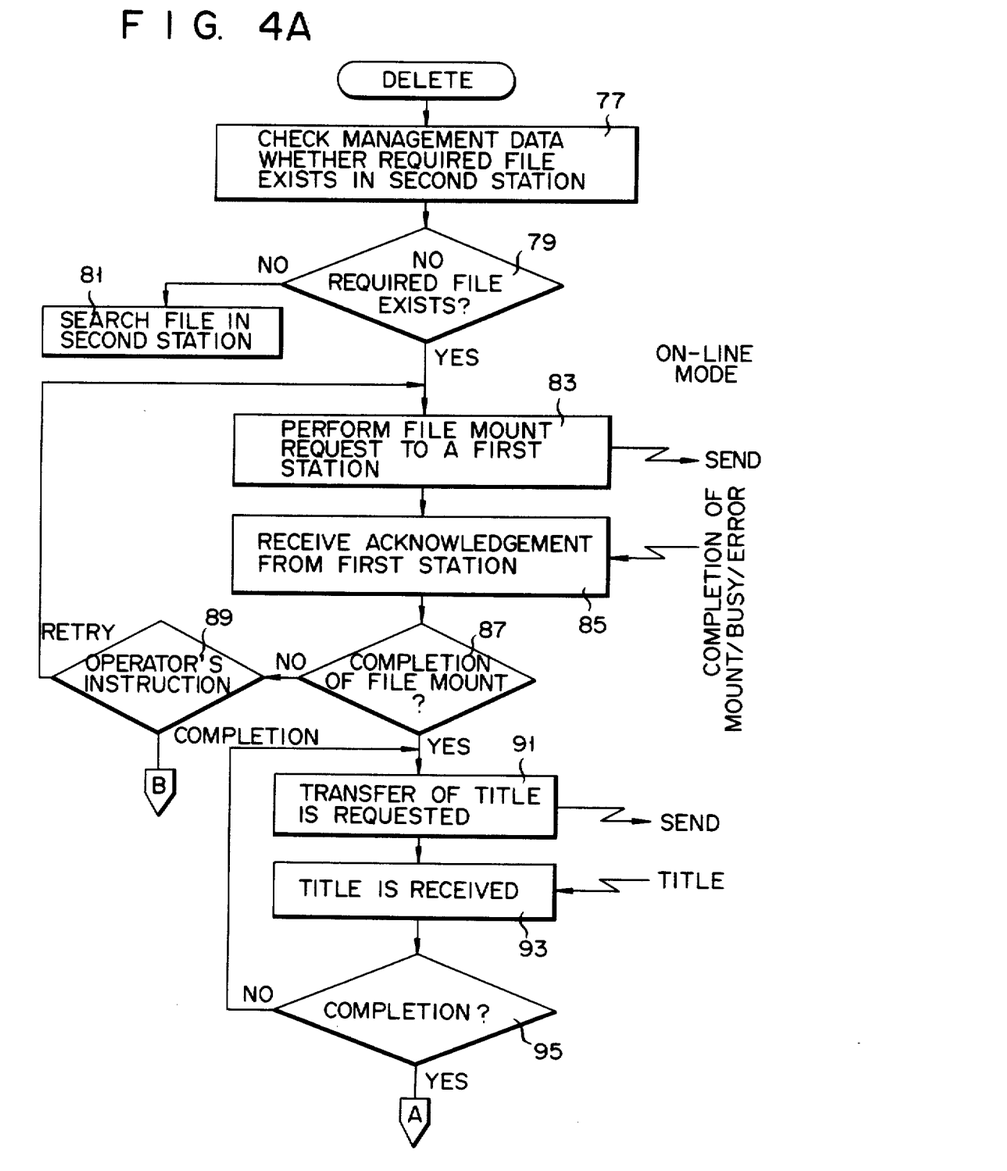
FIGS. 4A through 4C are flow charts for explaining the mode of operation of the system shown in FIG. 1 in the deletion mode.
Figure 4B:
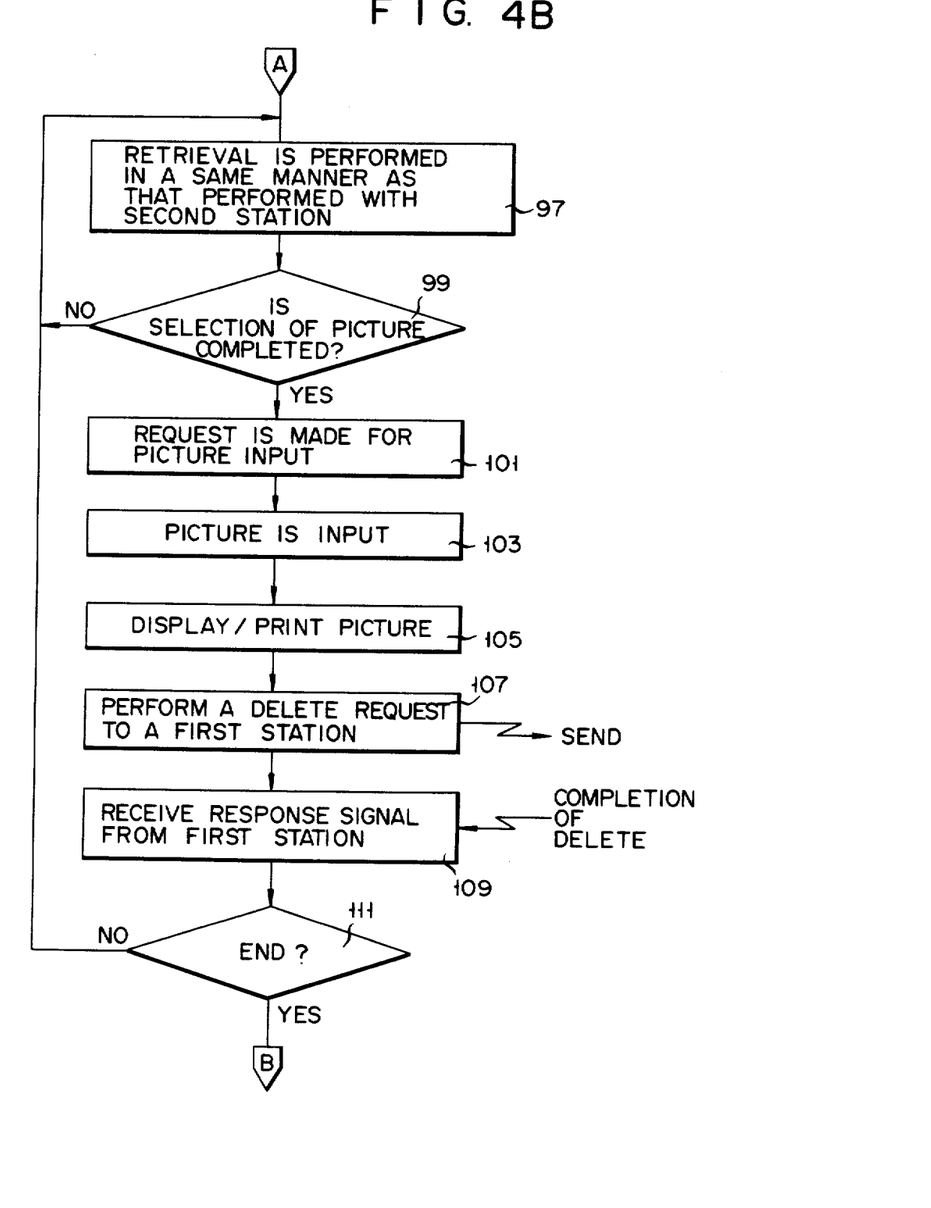
Figure 4C:
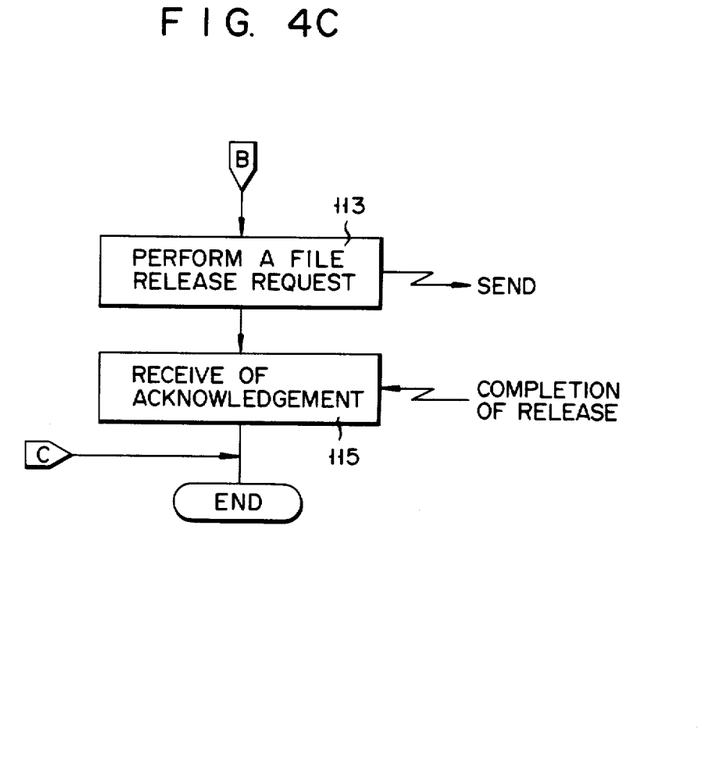

In the retrieval mode, the main control unit 11 of the second station (to be referred to as the second station for brevity hereinafter) checks whether a file storing desired picture data exists in the second station (step 41). If the required file does not exist in the second station (YES in step 43), the on-line mode is set by key operation at the keyboard 15. A file mount request to the main control unit 21 of the first station (to be referred to the first station for brevity hereinafter) is supplied thereto through the second station communication unit 18, the communication line 30, and the first station communication unit 28 (step 47). The first station (apparatus 20) returns to the second station a busy signal if the first station is busy, an error signal if the required file does not exist in the first station, or a file mount completion signal after mounting the required file when the required file can be mounted (step 49). The second station discriminates the response signal from the first station in step 51. If the response signal is not the file mount completion signal (NO in step 51), control is returned to the operator. In step 53, the operator either retries a file amount request or terminates the retrieval mode. (If it is determined in step 43 that the required file does not exist in the first station, the next station is set as the next first station, and a similar flow to that described above is repeated.)

If the response signal from the first station is a file mount completion signal (YES in step 51), a transfer request signal for title data included in the required file is transmitted to the first station.

Figure 2:
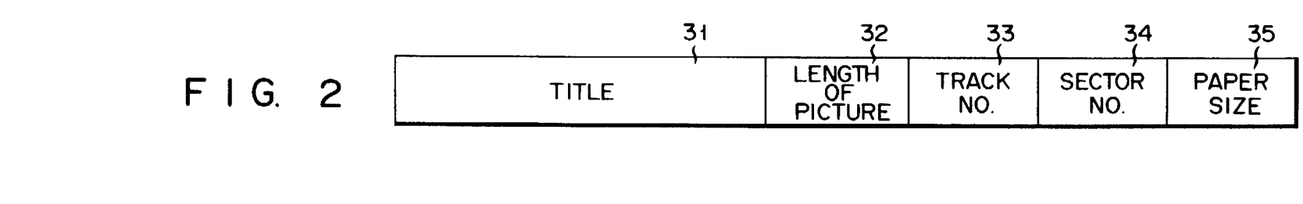
FIG. 2 shows the format of the title data.

In response to the transfer request signal, the first station sequentially sends to the second station the entire title data included in the file in the floppy disk 24 (steps 55, 57 and 59). The second station displays the entire title data at its CRT display unit 16. Then, the operator selects that title data among the picture data displayed at the CRT display unit 16 which corresponds to the required picture data. When a selected title 31 is entered at the keyboard 15, a corresponding picture length (number of sectors) 32, track No. 33, a sector No. 34, and paper size (paper size of the original document and the paper size to be used at the hard copy unit 17) 35 are transmitted to the first station. The first station performs retrieval of the file in accordance with the received track No. 33, the sector No. 34 and the like (steps 61 and 63). When the selected file is accessed, the first station signals to the second station that the file has been retrieved. As a result, the second station sends a picture input request signal to the first station (step 65). Then, the first station transmits the desired picture data (one picture) to the second station (step 67). Upon reception of the picture, the second station displays the picture at the CRT display unit 16 or produces a copy at the hard copy unit 17 (step 69). If further picture data is to be retrieved, steps 61 to 69 are repeated. If retrieval is to be ended (if YES in step 71), the second station sends a file release request signal to the first station (step 73). Then, the first station returns a file release completion signal as a response signal to the second station to end the retrieval mode.

When a need arises at the second station for deleting some picture data stored in a register in the first station, for example, the deletion mode is set at the keyboard 15. In the deletion mode (FIGS. 4A through 4C), steps 77 to 105 are the same as steps 41 to 59 in the retrieval mode, and a description thereof will be omitted. When the picture to be deleted has been retrieved in step 105, a delete request signal and the necessary parameters such as the track No. 33 and the sector No. 34 are supplied to the first station. In accordance with the received parameters, the first station deletes the corresponding picture data and sends a deletion completion signal as a response signal to the second station. The subsequent processing flow (steps 111 to 115) is the same as that (steps 71 to 75) in the retrieval mode.

When a need arises for storing in a register in the first (sub) station some picture data already stored in a register in the second (main) station, for example, the registration mode is set at the keyboard 15. In the registration mode (FIGS. 5A through 5C), steps 117 to 135 are the same as steps 41 to 59 in the retrieval mode, and a description thereof will not be made. In step 137, the title to be assigned to the new picture data is input at the keyboard 15. Furthermore, the picture data to be registered is input through the two-dimensional scanning device 12 (step 139). The second station sends a registration request signal to the first station (step 141) and also sends the picture data to be registered. The first station registers the received picture data in the optical disk 23 (step 143) and returns the picture length (number of sectors), track No., and sector No. of the registered picture data to the second station (step 145). The second station combines the received picture length, the track No., the sector No., and the title, and stores them as index data in the floppy disk 14 and also sends them to the first station (step 147). In this manner, the first and second stations store the same data, so that any subsequent retrieval or deletion can be performed with ease and without delay.

Figure 5A:
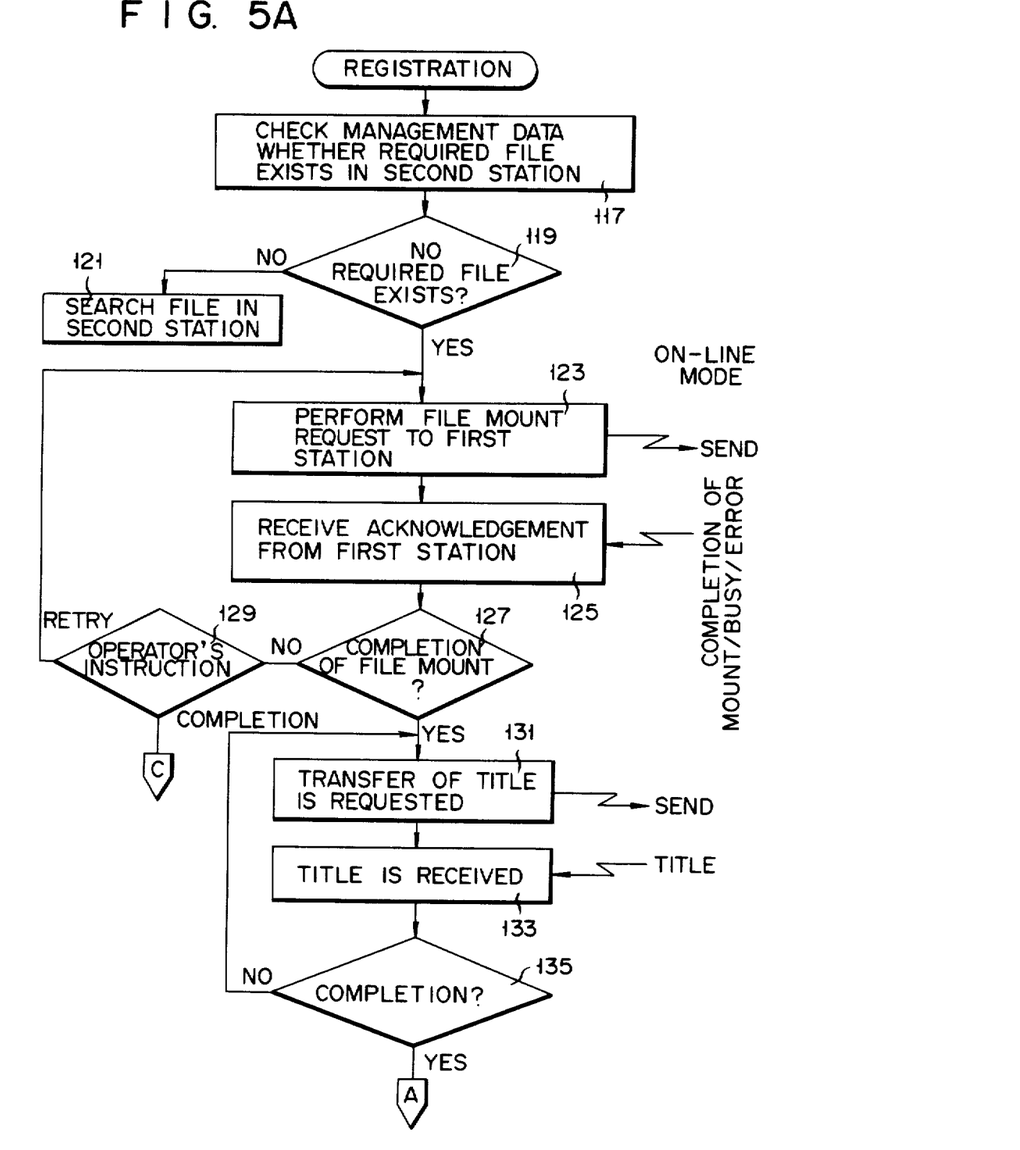
FIGS. 5A through 5C are flow charts for explaining the mode of operation of the system shown in FIG. 1 in the registration mode.
Figure 5B:
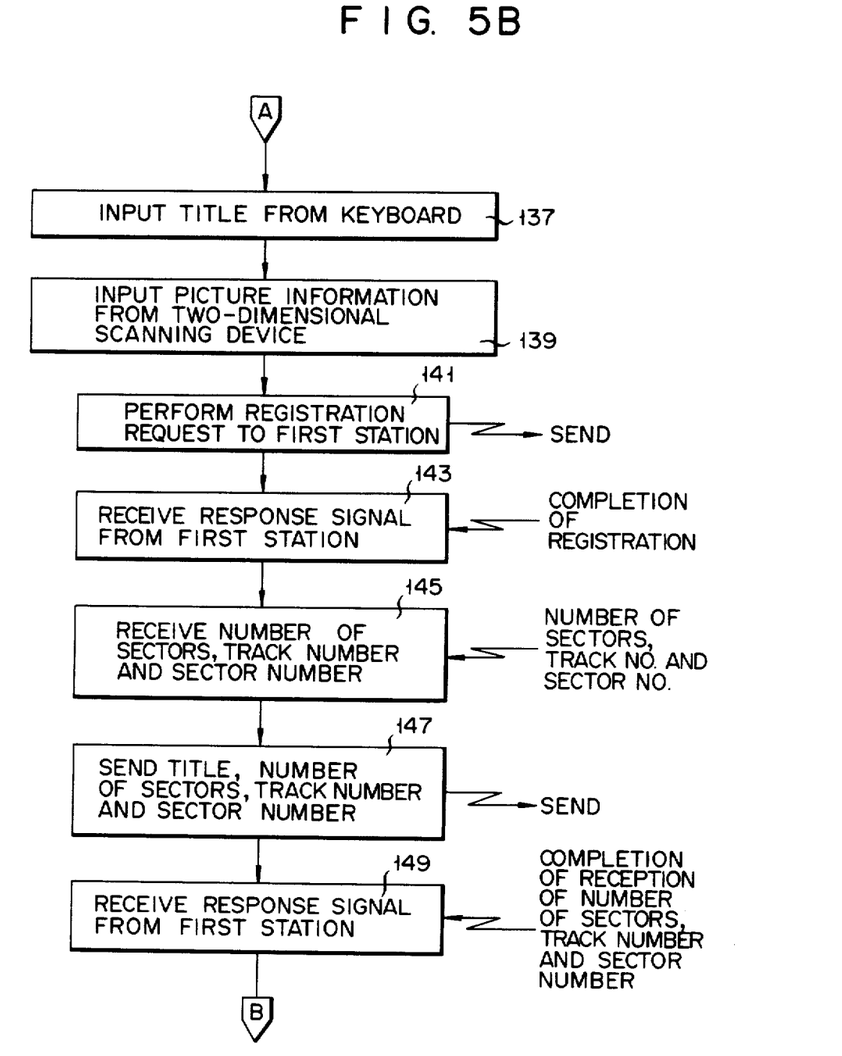
Figure 5C:
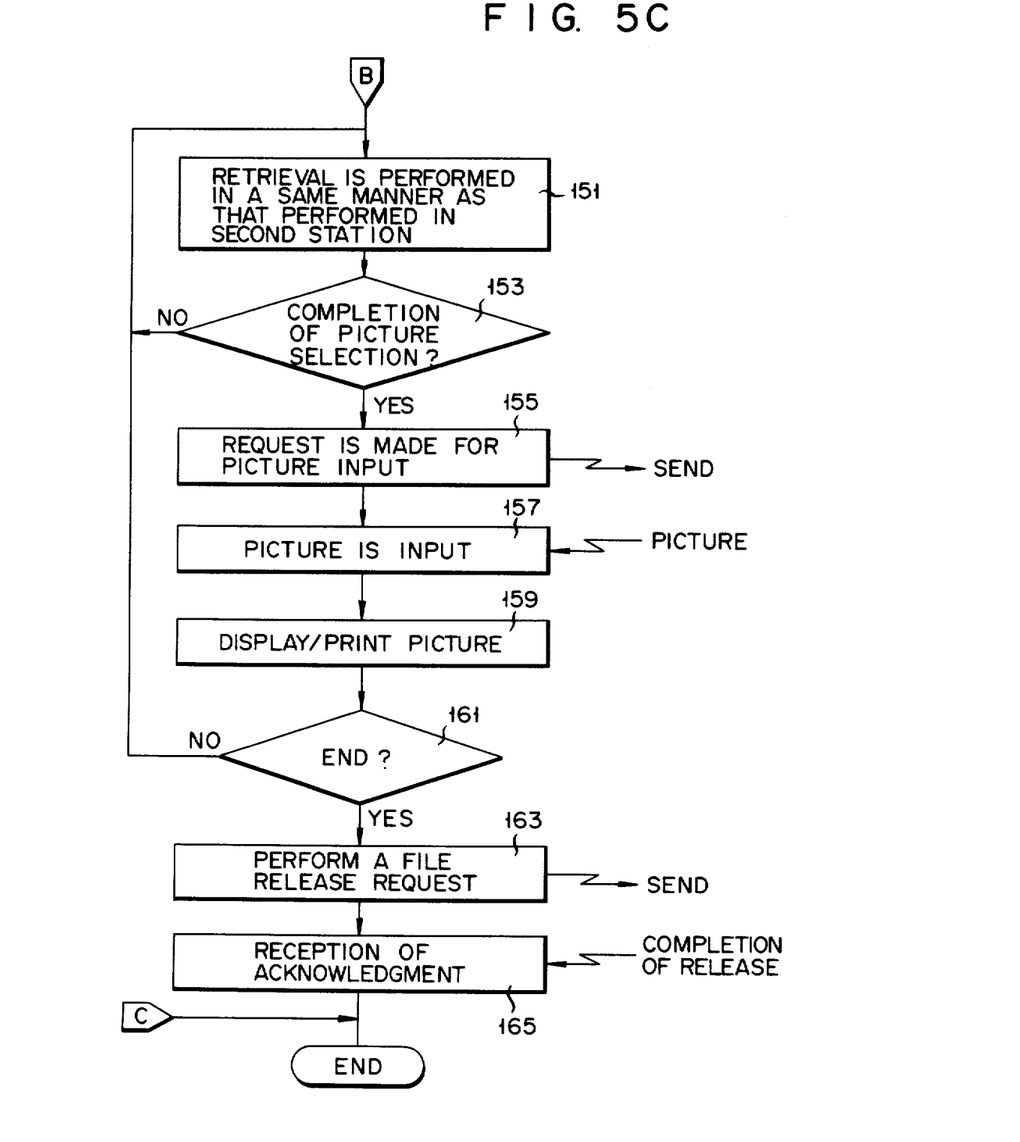

The first station stores the received index data in the floppy disk 24 and sends an end signal to the second station (step 149). As in the case of the retrieval mode, in steps 151 to 165 to follow, the register stored picture data can be retrieved and displayed at the CRT display unit 16 or produced as a hard copy by the hard copy unit 17.

What is claimed is:

1. A picture data storage/retrieval system formed of a plurality of picture data storage/retrieval apparatuses connected through a communication line, said system being selectively operable in an off-line mode in which each of said plurality of picture data storage/retrieval apparatuses is operable independent of other picture data storage/retrieval apparatuses, and selectively operable in an on-line mode in which at least one of said picture data storage/retrieval apparatuses is assigned as a first station while the other apparatuses are assigned as second stations, said first station being provided with optical disk means for storing said picture data, and groups of index data, and each of said substations being provided with local index data, so that a communication between said first station and said second station is established through a communication line, each picture data storage/retrieval apparatus of said plurality of picture data storage/retrieval apparatuses comprising:

(a) keyboard means for entering control data;

(b) magnetic disk means for storing a control program and index data associated with the picture data, each said index data including a first field designating a title of the associated picture data, a second field designating the length of the associated picture data, a third field designating a track number in which the associated picture data is stored, a fourth field designating a sector number in which the associated picture data is stored, and a fifth field designating a paper size of a document associated with the picture data;

(c) visual display means for visually displaying the picture data stored in said optical disk means;

(d) communication control means for allowing communication with another picture data storage/retrieval apparatus of said plurality of picture data storage/retrieval apparatuses; and (e) main control means, provided with a page memory, and operative in accordance with said control program stored in said magnetic disk means, for controlling said keyboard means, said magnetic disk means and said visual display means, so that said second station determines, in an on-line mode, if a desired index data is found in said second station, and sends a request to said first station to send said groups of index data to said second station, and said first station can send, in response to the first request, said groups of index data in said magnetic disk means of said first station to said magnetic disk means in said second station;

and so that said second station is operated off-line after said index data groups are supplied to said second station from the first station and sends to said first station, when finding the desired index data, a second request to send the desired picture data corresponding to the desired index data to said second station; and said first station sends, in response to the second request, the desired picture data in said optical disk means of said first station to said page memory in said main control means of said second station.

2. A system according to claim 1, wherein said visual display means comprises a cathode-ray tube display unit.

3. A system according to claim 1, wherein said visual display means comprises a printer unit.

4. A system according to claim 1, wherein said main control means comprises a microcomputer.

5. A system according to claim 1, wherein said main control unit of said each picture data storage/retrieval apparatus supplies the control data to said another picture data storage/retrieval apparatus through said communication control means of said each picture data storage/retrieval apparatus and said another picture data storage/retrieval apparatus, the control data including a picture length, a track number, and a sector number of the picture data and a paper size.

6. A picture data storage/retrieval system formed of a plurality of picture data storage/retrieval apparatuses connected through a communication line, said system being selectively operable in an off-line mode in which each of said plurality of picture data storage/retrieval apparatuses is operable independent of other picture data storage/retrieval apparatuses, and selectively operable in an on-line mode in which at least one of said picture data storage/retrieval apparatuses is assigned as a first station while the other apparatuses are assigned as second stations, said first station being provided with optical disk means for storing said picture data, and groups of index data, and each of said substations being provided with local index data, so that a communication between said first station and said second station is established through a communication line, each picture data storage/retrieval apparatus of said plurality of picture data storage/retrieval apparatuses comprising:

(a) keyboard means for entering control data;

(b) magnetic disk means for storing a control program and index data associated with the picture data, each said index data including a first field designating a title of the associated picture data, a second field designating the length of the associated picture data, a third field designating a track number in which the associated picture data is stored, a fourth field designating a sector number in which the associated picture data is stored, and a fifth field designating a paper size of a document associated with the picture data;

(c) visual display means for visually displaying the picture data stored in said optical disk means;

(d) communication control means for allowing communication with another picture data storage/retrieval apparatus of said plurality of picture data storage/retrieval apparatuses; and (e) main control means, provided with a page memory, and operative in accordance with said control program stored in said magnetic disk means, for controlling said keyboard means, said magnetic disk means and said visual display means, so that said second station determines, in an on-line mode, if a desired index data is found in said second station, and sends a request to said first station to send said groups of index data to said second station, and said first station can send, in response to the first request, said groups of index data in said magnetic disk means of said first station to said magnetic disk means in said second station.

* * * * *